(12) United States Patent
Middleton et al.

(10) Patent No.: US 12,472,414 B2
(45) Date of Patent: Nov. 18, 2025

(54) GRAPHICAL USER INTERFACE (GUI) A GOLF TRAINING APPARATUS OR SYSTEM AND/OR A METHOD OF USE THEREOF

(71) Applicant: ZEN CORPORATION LIMITED, Rotherham (GB)

(72) Inventors: Nicholas Mark Middleton, Rotherham (GB); William Lewis Middleton Stubbs, Rotherham (GB)

(73) Assignee: ZEN CORPORATION LIMITED, Rotherham (GB)

( * ) Notice: Subject to any disclaimer, the term of this patent is extended or adjusted under 35 U.S.C. 154(b) by 44 days.

(21) Appl. No.: 18/624,329

(22) Filed: Apr. 2, 2024

(65) Prior Publication Data

US 2024/0335722 A1  Oct. 10, 2024

(30) Foreign Application Priority Data

Apr. 6, 2023 (GB) ...................... 2305131

(51) Int. Cl.
| | |
|---|---|
| *G06F 3/04817* | (2022.01) |
| *A63B 69/36* | (2006.01) |
| *A63B 71/06* | (2006.01) |
| *G06F 3/01* | (2006.01) |
| *G06F 3/04847* | (2022.01) |
| *G06F 3/0486* | (2013.01) |
| *G06F 3/0488* | (2022.01) |
| *G06F 3/16* | (2006.01) |

(52) U.S. Cl.
CPC .......... *A63B 69/36* (2013.01); *A63B 71/0619* (2013.01); *G06F 3/015* (2013.01); *G06F 3/016* (2013.01); *G06F 3/017* (2013.01); *G06F 3/04817* (2013.01); *G06F 3/04847* (2013.01); *G06F 3/0486* (2013.01); *G06F 3/0488* (2013.01); *G06F 3/167* (2013.01); *A63B 2071/0636* (2013.01); *A63B 2071/0655* (2013.01)

(58) Field of Classification Search
None
See application file for complete search history.

(56) References Cited

U.S. PATENT DOCUMENTS

| | | | | |
|---|---|---|---|---|
| 3,871,661 A | * | 3/1975 | Korff | ...................... A63B 67/02 |
| | | | | 473/160 |
| 4,343,469 A | * | 8/1982 | Kunita | ............... A63B 69/3676 |
| | | | | 273/118 A |
| 5,441,265 A | * | 8/1995 | Codlin | ................... A63B 67/02 |
| | | | | 473/160 |
| 6,050,901 A | * | 4/2000 | Davis | ..................... A63B 67/02 |
| | | | | 473/160 |

(Continued)

*Primary Examiner* — Paul A D'Agostino
(74) *Attorney, Agent, or Firm* — McKee, Voorhees & Sease, PLC

(57) ABSTRACT

A graphical user interface (GUI) is provided for use with golf training apparatus. The golf training apparatus comprises a physical movable platform including a physical movable platform surface. The GUI is arranged so that it can be associated with and/or communicatively coupled with the physical platform in use. The GUI includes or is arranged to display in use a virtual graphical representation (VGR) of the physical platform and/or physical movable platform surface with which it is associated with and/or communicatively coupled with.

14 Claims, 11 Drawing Sheets

(56) References Cited

U.S. PATENT DOCUMENTS

| | | | |
|---|---|---|---|
| 6,059,672 A * | 5/2000 | Zeiner-Gundersen | A63B 69/3605 473/407 |
| 6,179,721 B1 * | 1/2001 | Bevan | A63B 69/3661 473/171 |
| 6,254,492 B1 * | 7/2001 | Taggett | A63B 69/3623 473/219 |
| 6,338,682 B1 * | 1/2002 | Torchia | A63B 67/02 473/160 |
| 7,918,743 B2 * | 4/2011 | Martens | A63B 67/02 473/160 |
| 8,253,747 B2 * | 8/2012 | Niles | G06T 13/20 345/619 |
| 8,616,988 B1 * | 12/2013 | Coffman | A63B 24/0003 473/150 |
| 9,592,437 B2 * | 3/2017 | Flammer | A63B 67/02 |
| 10,500,470 B2 * | 12/2019 | Flammer | A63B 69/3676 |
| 10,687,145 B1 * | 6/2020 | Campbell | H04H 60/58 |
| 11,103,759 B2 * | 8/2021 | Flammer | A63B 24/00 |
| 11,715,387 B2 * | 8/2023 | Delisle | G09B 9/24 434/32 |
| 11,904,228 B2 * | 2/2024 | Arand | A63B 67/02 |
| 12,310,749 B2 * | 5/2025 | Connor | A61B 5/6803 |
| 2002/0173365 A1 * | 11/2002 | Boscha | A63B 69/362 473/131 |
| 2003/0069052 A1 * | 4/2003 | Higashiyama | A63F 13/45 463/4 |
| 2003/0109322 A1 * | 6/2003 | Funk | A63B 69/3623 473/219 |
| 2003/0186753 A1 * | 10/2003 | Chen | A63B 67/04 473/160 |
| 2004/0198524 A1 * | 10/2004 | Kwon | A63B 24/0021 473/151 |
| 2008/0207347 A1 * | 8/2008 | Rose | A63B 69/3676 473/409 |
| 2011/0171612 A1 * | 7/2011 | Gelinske | G09B 9/08 434/35 |
| 2011/0192096 A1 * | 8/2011 | Koberinski | E04B 5/43 52/126.6 |
| 2012/0122062 A1 * | 5/2012 | Yang | G09B 9/00 434/219 |
| 2012/0184340 A1 * | 7/2012 | Jang | A63B 71/0622 463/2 |
| 2014/0267592 A1 * | 9/2014 | Lee | H04N 23/632 348/36 |
| 2017/0304705 A1 * | 10/2017 | Hermandorfer | G06T 11/60 |
| 2019/0134506 A1 * | 5/2019 | Gupta | G09B 19/0038 |
| 2021/0379445 A1 * | 12/2021 | Korpach | A63F 13/537 |
| 2022/0105416 A1 * | 4/2022 | Arand | A63B 37/0075 |

* cited by examiner

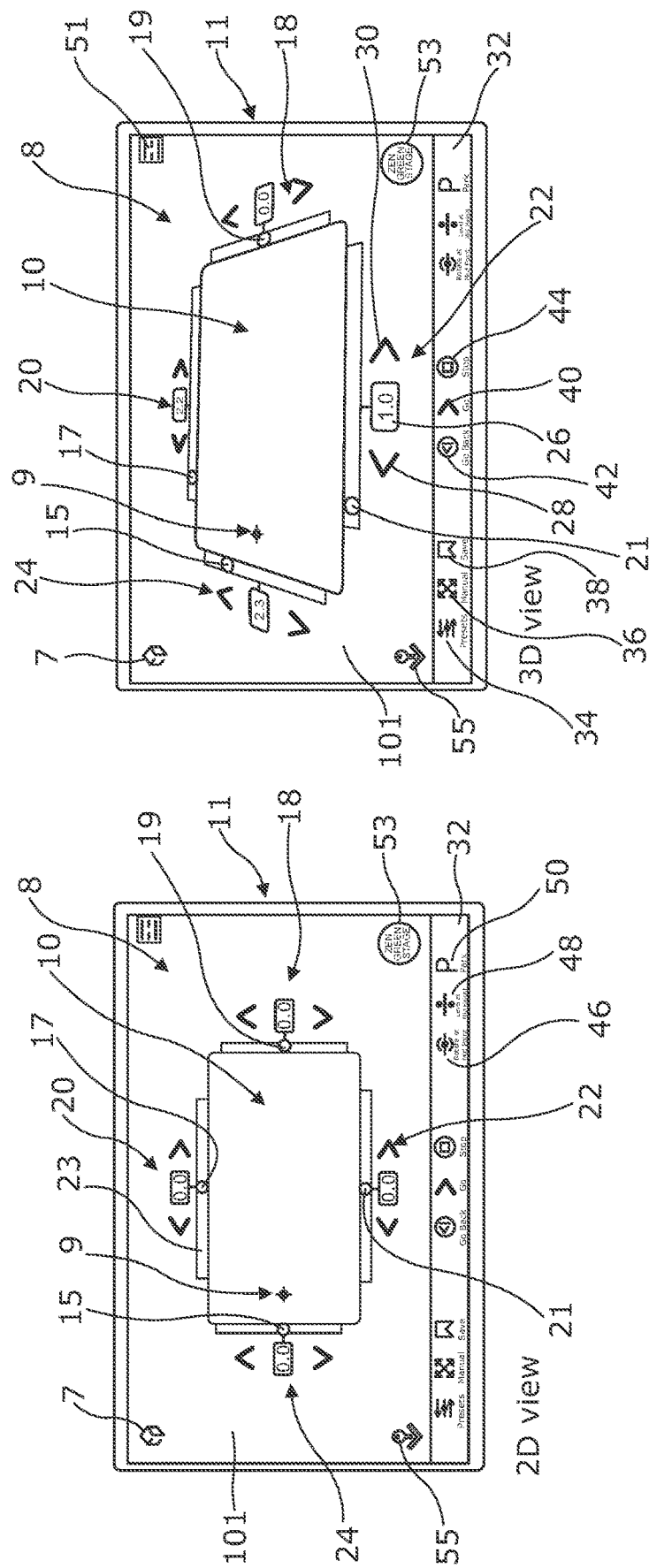

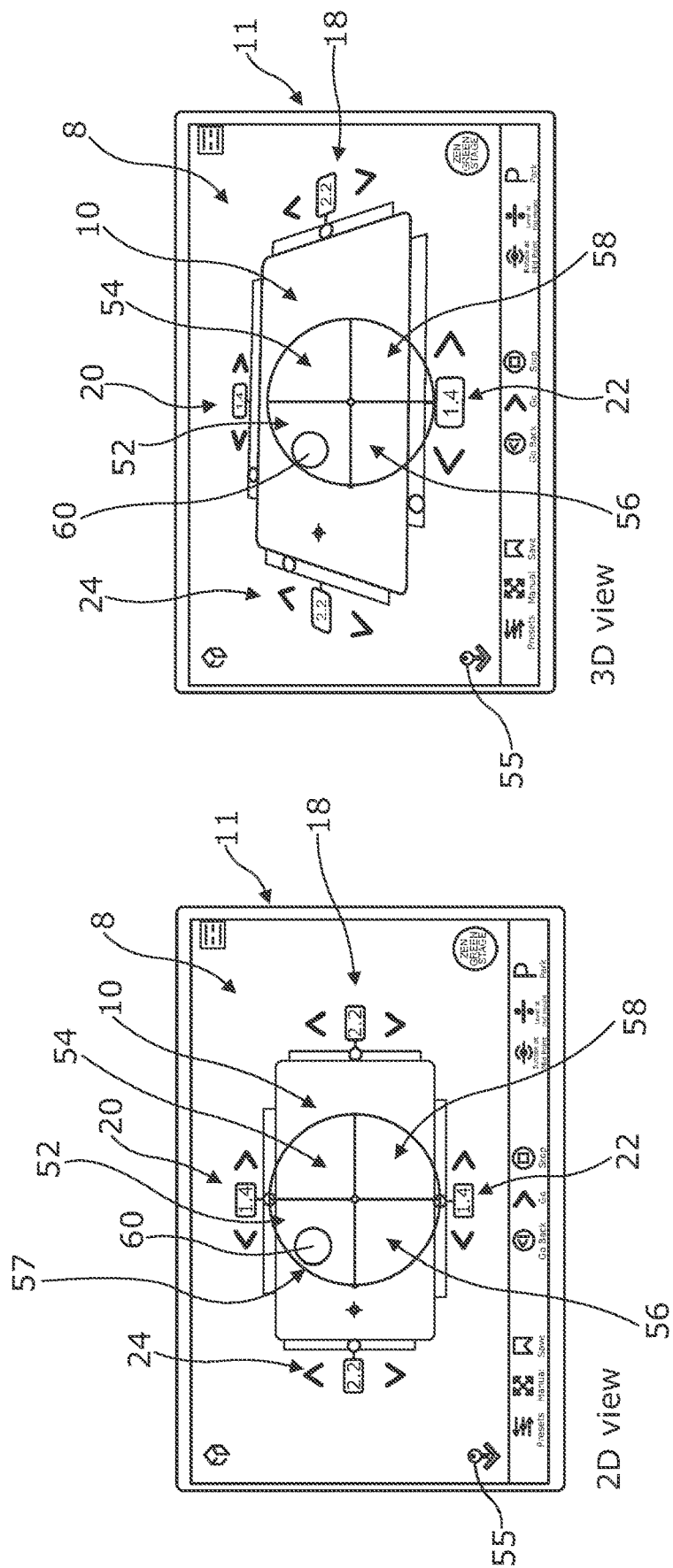

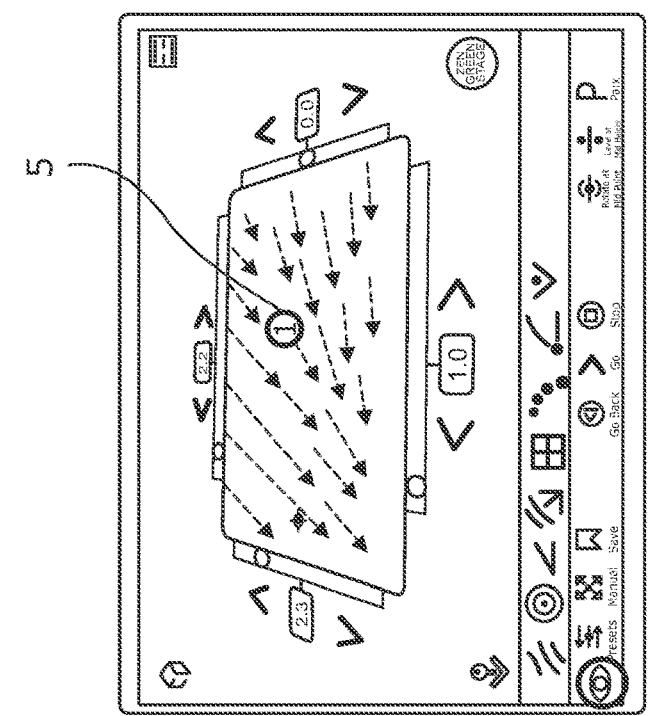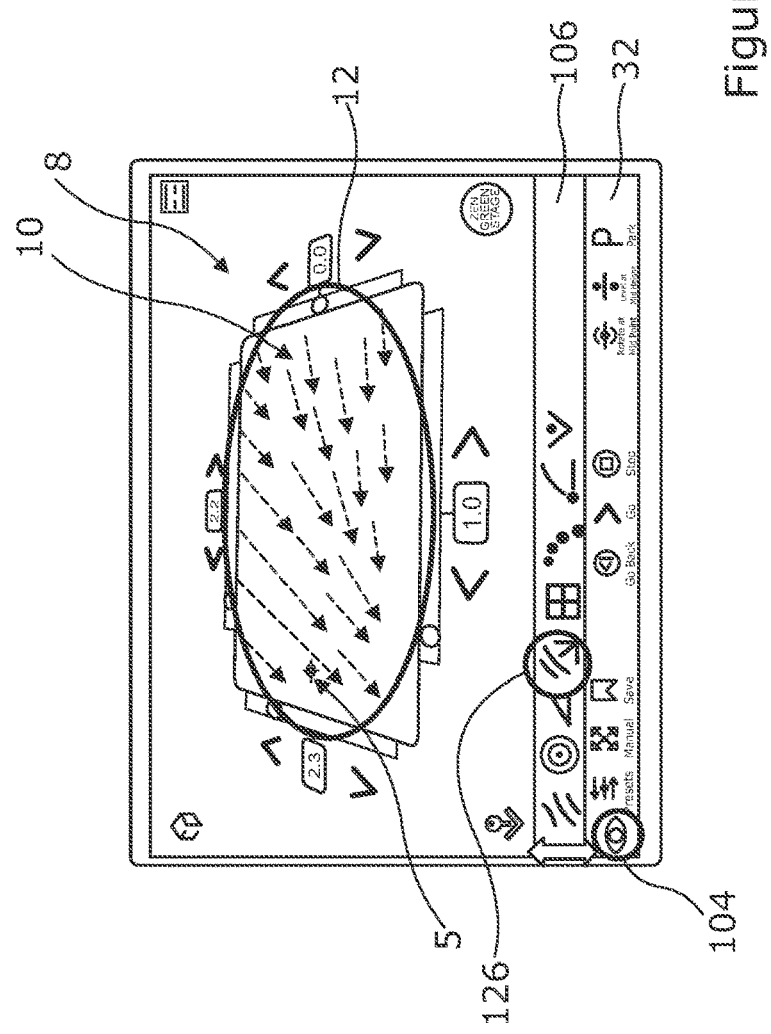
Figure 10

GRAPHICAL USER INTERFACE (GUI) A GOLF TRAINING APPARATUS OR SYSTEM AND/OR A METHOD OF USE THEREOF

CROSS REFERENCE TO RELATED APPLICATIONS

This application claims priority under 35 U.S.C. § 119 to Great Britain Patent Application GB 2305131.1 filed Apr. 6, 2023, which is herein incorporated by reference in its entirety, including without limitation, the specification, claims, and abstract, as well as any figures, tables, appendices, or drawings thereof.

FIELD OF THE DISCLOSURE

This invention relates to a golf training apparatus, a golf training system, a graphical user interface (GUI) for use with the golf training apparatus and/or a method of use thereof.

It is known to provide golf training systems that include an adaptive terrain platform or movable platform that allow a golf player to reproduce a variety of different golf playing surfaces or environments in an indoor setting to practise on and improve their performance. For example, a typical adaptive terrain platform will have one or more movement mechanisms located beneath a platform playing surface which allows the playing surface to be adjusted according to a set of user requirements. Optionally, at least one putting hole or cup may also be defined on the platform playing surface to allow a user to putt a golf ball into the hole/cup for the user selected platform terrain. For example, the gradient of the platform playing surface can be moved to different gradients by the user to replicate different golf course landscapes and/or settings on which a user may wish to train and/or play. A control unit is typically associated with the adaptive terrain platform to allow movement of the platform playing surface according to one or more pre-determined or user selected parameters. Conventionally, a User Interface (UI) is provided which is communicatively coupled to the control unit to allow a user to control the movement of the platform playing surface via the control unit in use. For example, the UI can be accessed via an Application Program (APP) or software program on a player's mobile phone. In one example, the conventional UI typically comprises a plurality of user selectable two-dimensional press buttons displayed on the display screen to allow a user to select one or more pre-determined settings for moving the playing surface of the platform. Selection of one or more of the pre-determined settings moves the playing surface of the platform in the selected pre-determined manner. Problems associated with the current UI are that it is difficult for a user to visualise a pre-determined setting they have selected or may wish to select for the platform, other than waiting for the playing surface of the platform to move to the pre-determined setting once selected. In addition, the current UI is limited in the parameters it can control and/or the means by which this control is actuated. Furthermore, the user is having relatively little interaction with the platform and the platform settings and therefore there is very little opportunity for user guided discovery and the apparatus therefore has only limited application for improving skill acquisition.

BRIEF DESCRIPTION

It is therefore an aim of the present invention to provide a golf training system and/or a method of use thereof that overcomes the abovementioned problems.

It is a further aim of the present invention to provide golf training apparatus for use in a golf training system and/or a method of use thereof.

It is a yet further aim of the present invention to provide a graphical user interface (GUI) for use with a golf training apparatus and/or a method of use thereof.

According to a first aspect of the present invention there is provided a graphical user interface (GUI) for use with golf training apparatus, said golf training apparatus including a physical platform including a physical movable platform surface, said GUI arranged so that it can be associated with the physical platform or physical movable platform surface in use, characterised in that the GUI includes or is arranged to display a virtual graphical representation (VGR) of at least the physical movable platform surface of the physical platform with which it is associated with in use.

Thus, the GUI according to the present invention provides a VGR of at least the physical movable platform surface and/or the physical platform to allow a user to easily visualise a selection they have made to control one or more control parameters and/or functions of the physical movable platform in use. The user can look at the VGR on the GUI to determine if a control selection they have made is suitable prior to, or in addition to, the control selection being communicated to the physical platform. The GUI and/or the VGR can allow one or more user selectable arbitrary controls and/or changes to be made to the same, and therefore the associated platform and/or physical movable playing surface. This allows a greater interaction between a user and their training environment/golf training apparatus which improves enhanced user skill acquisition. In addition, the GUI and/or VGR can allow a virtual representation of a player, golf swing, action and/or shot to be displayed on the VGR to provide data to a user as to how a golf swing, action and/or shot may need to be taken in reality. Furthermore, the GUI can be arranged to receive data from an associated and/or communicatively coupled physical platform relating to a golf swing, action and/or shot that has been taken and visually represent the same on the VGR for viewing by a user. This can provide valuable feedback data for a user to help improve their training and/or performance. Yet further, the GUI can be arranged to receive data from one or more other adaptive terrain platforms which may not be associated with the GUI but which allows player, golf swing, action and/or shot data to be collated and stored as one or more pre-determined settings on the GUI for visual representation on the VGR. For example, one or more historic shots taken by famous golfers could be stored in the GUI and could be visually represented on the VGR for selection by a user. This would allow a user to reproduce and/or analyse a historic shot via their VGR and/or their associated physical platform.

Thus, the GUI of the present invention is able to function using one way or multi way communication and/or provide one way or multi-way feedback. The GUI can be used to receive and display feedback data obtained from a physical platform, a physical movable playing surface, a user thereof and/or one or more sensing devices provided on or associated therewith, and/or it can be used to display data selected by a user via the GUI and optionally feedback this selected data to the physical platform, the physical movable playing surface, a user thereof and/or one or more sensing devices provided on or associated therewith.

Thus, the present invention provides augmented user control and/or visualisation of a golfing environment by changing, visually representing and/or controlling one or more parameters associated with at least a physical playing surface of a physical adaptive terrain platform.

The GUI of the present invention encourages self-organisation and self-realisation of the user and provides a more representative real world golf environment for the user to train in. The GUI provides a mechanism for allowing enhanced variability, interventions and/or perturbations in movement of the user and the golf training apparatus. Thus, the GUI in combination with the golf training apparatus provides a learning system which encourages the user to interact with the same and increase their knowledge and skill. It encourages the user to become more engaged with their golf training environment and thereby improve skill acquisition.

Preferably reference to a physical movable platform or physical movable platform surface refers to a real world or non-virtual platform or platform surface.

In one embodiment the VGR is arranged to display data relating to a golfing environment; one or more user selections that could be made in the past, present or future, or have been made to the physical platform or physical movable platform surface; and/or a past, current or future status, situation and/or setting of the physical platform, the physical movable platform surface, a further physical platform, a further physical movable platform surface, a golf player, an item of golf equipment; a sensing device associated with and/or provided with a golf player, the physical platform or physical movable platform surface and/or a golf player using the physical platform, physical movable platform surface, further physical platform or further physical movable platform surface in use.

Preferably one or more dimensions, shape, design, position, topography, gradient and/or orientation of the VGR displayed on the GUI is arranged to correspond wholly or substantially wholly to one or more dimensions, shape, position, topography, gradient and/or orientation of the physical movable platform surface and/or the physical platform with which the GUI is associated and/or communicatively coupled in use. Preferably the VGR is a scaled or scaled down version or representation of the physical movable platform surface or physical platform with which the GUI is associated with in use.

Preferably the GUI is arranged so that a visual appearance, view type, size, position, one or more colours and/or orientation of the VGR that is displayed on the GUI is selectable and/or adjustable by a user in use.

For example, in one embodiment the VGR is a representation in a plan view, an end view, a side view or perspective view of the physical movable platform surface and/or the physical platform with which the GUI is associated with in use.

Preferably the VGR is arranged to display a two-dimensional (2D) VGR of at least the physical movable platform surface of the physical platform and/or a three-dimensional (3D) VGR of at least the physical movable platform surface of the physical platform with which the GUI is associated in use.

Preferably a user can select via the GUI which view, the 2D VGR and/or 3D VGR is displayed at any time on the GUI.

Preferably the VGR displayed on the GUI is arranged so as to be clearly visually distinguishable in appearance from a background of the GUI by a user in use. For example the VGR can be displayed on a background of the GUI and the VGR is clearly distinguishable from the background of the VGR, such as by colour, outline and/or the like. In one example, one or more visual aspects of the VGR and/or background can be user selectable to allow a user to select the best visual representation for their vision. This allows conditions such as colour blindness or vision restriction to be catered for.

Preferably the visual appearance, size, position and/or orientation of the VGR that is displayed on the GUI is movable and/or adjustable in use. For example, a VGR view control means can be provided which allows a user to change and/or move the view of the VGR on the GUI. For example, the VGR view control means could be a toggle control button that allows the VGR to be displayed in 2D or D3, whether it is located in the centre of a display page of the GUI, whether it is located off-centre of a display page of the GUI and/or the like.

Preferably the GUI is arranged such that user selection of one or more control functions of the GUI and/or VGR results in control of one or more functions of the physical platform or physical movable surface.

In one embodiment user selection of one or more control functions of the GUI and/or VGR, such as for example to change a parameter of the VGR on the GUI, results in or is arranged to result in a scaled, comparable, corresponding, equal or substantially equal control of the physical platform and/or the physical movable platform surface with which the GUI is associated in use; and/or vice versa.

In one embodiment the GUI and/or VGR includes control means for allowing a user to select and/or control the one or more control functions and/or one or more parameters of the VGR, the physical platform and/or the physical movable platform surface associated with the GUI in use.

Preferably the control means can also include visual control means or one or more visual icons.

Preferably the control means are user selectable and/or actuatable via the VGR and/or GUI in use.

Preferably the control means can be provided as part of the VGR on the GUI and/or separate to the VGR on the GUI.

For example, if a user wishes to change a gradient of the physical movable surface of the physical platform in use, the user may decide to first make a corresponding change the gradient on the VGR visually shown on the GUI. A user can therefore immediately see the gradient change they have selected via the VGR without having to visualise the change on the physical movable platform or wait for the physical movable platform to make the change.

Preferably control, actuation and/or adjustment of the VGR via the control means is via visual control means and/or one or more visual icons that are selectable by a user in use.

In one embodiment user selection and/or actuation of the control means of the GUI and/or VGR only results in control and/or a change in the VGR displayed on the GUI and does not result in control and/or a change in the physical platform or physical movable platform surface with which the GUI is associated in use.

In one embodiment user selection and/or actuation of the control means of the VGR and/or GUI results in both control and/or a change in the VGR displayed on the GUI and a corresponding control and/or a change in the physical platform or physical movable platform surface with which the GUI is associated in use.

In one embodiment user selection and/or actuation of the control means of the GUI and/or VGR results in control and/or a change in the VGR displayed on the GUI a pre-determined time period prior to, during and/or after control and/or a change in the physical platform or physical movable platform surface with which the GUI is associated in use.

In one embodiment user selection and/or actuation of the control means of the GUI and/or VGR results in control and/or a change in the physical platform or physical movable platform surface without any control and/or change of the VGR on the GUI. Thus, in this embodiment, it is still possible to use the GUI of the present invention in a conventional manner without display of the VGR and/or without control of the VGR on the GUI.

In one embodiment in order for the user to control and/or actuate a change in the physical movable platform surface or physical platform with which the GUI is associated in use, a user is required to first select and/or actuate the control means, of the VGR and/or GUI to bring about a change and/or control of the VGR on the GUI, and then secondly make a further one or more selections to bring about control and/or actuation of the physical movable platform surface or physical platform. For example, a user may change the gradient of the VGR on the GUI, check they are happy with the gradient selection they have made, before then selecting the gradient change to be applied to the physical platform or physical movable platform surface.

In one embodiment the control means of the GUI includes any or any combination of one or more sliders or slidable members; one or more toggles or toggle members; voice activation means; one or more dials or dial members; one or more rotatable, slidable and/or pivotable members; one or more joysticks or joystick members; one or more push or touch screen buttons; one or more drag and drop means, one or more spirit bubble level means or members, haptic means, vision tracking devices, voice activated means, brain computer interface, anatomical gesture recognition device, one or more transducers, neuromuscular stimulation means, visual display means, augmented reality means, virtual reality means and/or the like.

Preferably actuation of one or more of these control means allows control and/or actuation of the VGR on the GUI and/or the physical movable platform surface or physical platform with which the GUI is associated in use.

In one embodiment two or more different control means are provided to allow control of the VGR on the GUI, further preferably three or more different control means are provided, and yet further preferably four or more different control means are provided. For example, a toggle member, a slidable member, a spirit bubble or joystick member and one or more touch buttons can be provided to control the VGR. Preferably the different control means can be displayed on the GUI at the same time or can be selected for display at different times.

Preferably selection or actuation of one or more control means on the GUI results in a change in appearance of the control means and/or issuance of a visual, audio and/or kinaesthetic signal to inform a user that a selection has been made. For example, a control means can change in size, design, appearance, colour and/or the like once selected or unselected, thereby allowing the user to be informed that they have successfully made a selection or deselection on the GUI.

Preferably once a control function being controlled by the control means of the GUI has been completed, the change in size, design, appearance, colour and/or the like of the control means and/or the issuance of a visual, audio and/or kinaesthetic signal stops, reverts back to an original form.

In one embodiment the one or more control functions the control means can be used to select and/or change includes any or any combination of (in respect of the VGR and/or the physical platform or physical movable platform surface) a gradient, terrain, one or more environmental conditions or constraints, topography, one or more manual selections, one or more pre-determined selections, any or any combination of movement up to and including six degrees of freedom, actuation of a control operation, stopping of a control operation, revert back to a previous control operation, save a control operation, level the gradient of the platform surface, actuate a ball tracking function, actuate a ball trajectory function; display a contour map and/or one or more contour lines; display a ball trajectory line; display a zero break line; display a capture funnel; display distance measuring means; display gravity lines; stop and/or start the electrical power to the GUI, control unit and/or the platform; input user data; the coordinates of a cartesian based movable surface; optimal ball trajectory; collision geometry; hole/target geometry; hole/target capture funnel; and/or the like.

In one embodiment the GUI includes one or more pre-determined control settings and the control means are arranged to allow user selection of the one or more pre-determined control settings in use. For example, one or more pre-determined gradients and/or topographies of the playing surface can be stored in the GUI and, on selection of the pre-determined gradient and/or topographies, this results in the selected gradient and/or topography being applied to the VGR and/or the physical movable platform surface of the physical platform with which the GUI is associated in use.

Preferably the one or more pre-determined control settings can relate to the position, gradient, topography and/or orientation of the VGR and/or physical movable platform or platform surface, the position and/or orientation of one or more ball putting holes on the VGR and/or physical movable platform, the position and/or orientation of one or more golf ball trajectories on the VGR and/or physical movable platform, one or more environmental conditions of the VGR and/or physical playing surface of the physical movable platform; a gradient, terrain, one or more environmental conditions or constraints, topography, one or more manual selections, one or more pre-determined selections, any or any combination of movement up to and including six degrees of freedom, actuation of a control operation, stopping of a control operation, revert back to a previous control operation, save a control operation, level the gradient of the platform surface, actuate a ball tracking function, actuate a ball trajectory function; display a contour map and/or one or more contour lines; display a ball trajectory line; display a zero break line; display a capture funnel; display distance measuring means; display gravity lines; collision geometry; hole/target geometry; optimal ball trajectory data; cartesian topography data of the movable playing surface; stop and/or start the electrical power to the GUI, control unit and/or the platform; input user data and/or the like.

In one embodiment the control means of the GUI and/or VGR are arranged to allow one or more user selections or arbitrary user selections to be made to the VGR, GUI and/or the physical platform or physical movable platform surface with which the GUI is associated in use.

Preferably the one or more arbitrary user selections can relate to the position, gradient, topography and/or orientation of the VGR and/or physical movable platform or platform surface, the position and/or orientation of one or more ball putting holes on the VGR and/or physical movable platform, the position and/or orientation of one or more golf ball trajectories on the VGR and/or physical movable platform, one or more environmental conditions of the VGR and/or physical playing surface of the physical movable platform; a gradient, terrain, one or more environmental conditions or constraints, topography, one or more manual selections, one or more pre-determined selections, any or any combination of movement up to and including six degrees of freedom, actuation of a control operation, stopping of a control operation, revert back to a previous control operation, save a control operation, level the gradient of the platform surface, actuate a ball tracking function, actuate a ball trajectory function; display a contour map and/or one or more contour lines; display a ball trajectory line; display a zero break line; display a capture funnel; display distance measuring means; display gravity lines; hole/target geometry; collision geometry; cartesian topography of a physical movable platform surface; optimal ball trajectory; stop and/or start the electrical power to the GUI, control unit and/or the platform; input user data and/or the like.

In one embodiment the control means are arranged to allow a combination of at least one pre-determined control setting and at least one arbitrary user selection to be made to the GUI and/or to the physical platform or physical movable platform surface.

Preferably the one or more pre-determined control settings can be pre-determined by the manufacturer, can be saved as pre-determined settings via the GUI by the user and/or a coach; can be communicated to the GUI from a central server and/or the like. For example, data from a plurality of remote adaptive terrain systems can be collated by a central server and then communicated to the GUI for storage as one or more pre-determined settings on the GUI. This allows data from a plurality of users to be collated for use by any one of the users to help with their training and/or performance.

Preferably any or any combination of user selected arbitrary settings and pre-determined settings can be saved via the GUI to allow a user to repeat and/or retrieve a previous selected setting or settings.

In one embodiment the GUI is arranged to receive data or feedback data from the physical movable platform; the physical movable platform surface; a user or golf player of the physical movable platform or physical movable platform surface; any sensing devices provided on and/or associated with the user, user's equipment or golf player or equipment, the physical platform or physical movable platform surface and/or the like, and display the same on the VGR.

In one embodiment the GUI is arranged to receive real world feedback data, image data, audio data, broadcast image data and/or broadcast audio data and for the data to be displayed or converted for display on the VGR and/or GUI in use.

In one example, broadcast image and/or audio data is communicated with the GUI and/or the physical movable platform to allow one or more pre-determined selectable settings to be created for the VGR, GUI and/or the physical movable platform. For example, one or more golf shots taken by a golf professional in a live televised golf tournament can be simultaneously recreated on the VGR and/or GUI for user selection and/or display.

In one embodiment different colours, lines, shapes, images, icons and/or colour tones are used on the GUI to show a difference in gradient, height, terrain and/or topography of the VGR.

In one embodiment the GUI is arranged to display and/or control at least one virtual trajectory of a golf ball on the VGR on the GUI. For example, the virtual trajectory is one that can be selected and/or created by a user or it can be one based on an actual trajectory of a golf ball that has been recorded or sensed on the physical movable platform or physical movable platform surface and transmitted to the GUI for display on the VGR.

Preferably the virtual trajectory includes at least one virtual trajectory start point and at least one virtual trajectory end point.

Preferably the virtual trajectory includes at least one intermediate virtual trajectory point between said at least one virtual trajectory start point and the at least one virtual trajectory end point.

In one embodiment the user can move, change and/or select the virtual trajectory, the at least one virtual trajectory start point, the at least one virtual trajectory end point and/or the at least one intermediate virtual trajectory point on the VGR on the GUI using the control means. Preferably this can be done in a pre-determined manner or in a user selectable arbitrary manner. For example, a user can use a drag and drop feature to move a virtual golf ball trajectory on the VGR anywhere the user desires. The user can therefore experiment with different trajectory settings to allow them to challenge and/or vary their golf training environment in use.

Preferably the virtual golf ball trajectory allows a user to visually and virtually determine, select and/or change where a golf ball would go if they reproduced the selected ball trajectory in reality.

Preferably the virtual golf ball trajectory on the VGR can also be used to show the ball trajectory of a ball that has been tracked via the associated physical platform or platform surface. For example, a user can make a shot on the associated physical platform and then replay their shot via a virtual golf trajectory on the VGR.

In one embodiment one or more sensors provided with and/or associated with the golf training apparatus can provide real world feedback on a golf ball trajectory, golf ball swing, user/player and/or shot detected on the physical platform and use this real world data to be displayed on the VGR on the GUI in place of, in addition to or instead of a virtual golf ball trajectory.

In one embodiment the GUI is arranged to display and/or control the position and/or orientation of at least one golf putting hole and/or cup on the VGR, associated physical platform or physical movable platform surface. For example, a user can select one of a number of different possible pre-determined golf putting holes in which they wish to use on the VGR. The user could select for a hole and/or cup to be present or not present and/or the like.

In one embodiment the GUI is communicatively coupled directly or indirectly to the physical platform or physical movable platform surface with which the GUI is associated in use.

In one embodiment a physical control unit is provided and the control unit acts as a control intermediary between the GUI and the physical movable platform surface or physical platform with which the GUI is associated in use. For example, the control unit can be a physical unit that the GUI is communicatively coupled with in use.

Preferably the control unit is independent or, separate to and/or remotely located with respect to the GUI.

Preferably one way, two way and/or three way communication can take place between the GUI, the control unit, the physical platform, the user/player of the physical platform, sensing devices, golfing equipment and/or the physical movable platform surface.

In one embodiment the GUI is arranged to communicate directly with the physical movable platform surface or physical platform with which the GUI is associated in use.

Preferably the GUI and/or the VGR displayed on the GUI is generated using software, computer hardware, one or more mathematical models, one or more algorithms and/or the like Preferably the control unit, a device on which the GUI is displayed, the physical platform, the movement means of the physical platform and/or the like includes micro-processing means, such as for example, one or more electronic chips, computer, micro-processor, server and/or the like.

Preferably the GUI or the device on which the GUI is displayed in use is arranged to communicate or be communicatively coupled with the control unit, the player, sensing devices, golfing equipment, the physical movable platform surface and/or the physical movable platform by wired or wireless communication means.

For example, the wired means could include one or more electrical and/or data cables, wires, and/or the like.

For example, the wireless means could include WiFi, Bluetooth, Infra-Red (IR), radio frequency signals and/or the like.

In one embodiment the golf training apparatus includes display means or device on which the GUI is displayable in use. For example, the display means could include a mobile phone scree, a display on an electronic device, a display screen, a Liquid Crystal Diode (LCD) screen, touch screen display and/or the like.

Preferably the GUI is associated with a physical platform using identification (ID) means, a pairing process and/or the like. For example, one or more unique ID means may allow association between a GUI and a physical platform in use.

In one embodiment the golf training apparatus includes first micro-processing means or device, such as for example a mobile phone, hand held device, laptop, computer, Ipad, tablet and/or the like and the GUI is displayable on display means associated with said first micro-processing means.

Preferably the GUI is controlled via the first micro-processing means or device.

Preferably the control unit comprises second micro-processing means or device.

In one embodiment the GUI can be used to access, communicate with and/or control one or more inertia measurement units (IMUs), sensing devices or sensor means, other associated technology devices and/or the like.

In one embodiment the GUI can be used to control the physical movable platform in a conventional manner, such as via push-button control means on the GUI, or can be used to control the physical platform and/or any electronic device associated with the at least one physical platform via user arbitrary manipulation of the VGR and/or control means of the GUI.

According to a second aspect of the present invention there is provided golf training apparatus, said golf training apparatus including:
 a physical movable platform including a physical movable platform surface;
 an electronic device including micro-processing means;
 display means provided on, associated with or connectable to the electronic device,
 a graphical user interface (GUI) for display on the display means and arranged so that it is associated with and/or communicatively coupled with the physical movable platform or physical movable platform surface in use; characterised in that the GUI includes or is arranged to display in use a virtual graphical representation (VGR) of the physical platform and/or physical movable platform surface with which it is associated with and/or communicatively coupled with.

Preferably the physical movable platform includes movement means or one or more movement mechanisms for moving the at least physical movable platform surface in use.

Preferably the at least physical movable platform surface uses a cartesian control mechanism to control the topography of the same.

In one embodiment the movement means or movement mechanism include one or more height adjustment devices, rams, jacks, linear actuators and/or the like.

Preferably a plurality of movement means or movement mechanisms are provided in the physical movable platform to allow the physical movable platform to be moved in different directions and/or orientations and/or to allow different parts of the physical movable platform or platform surface to be moved.

Preferably each movement means or mechanism can be controlled independently or separately to each other and/or collectively.

For example, the movement means can be arranged to allow up to and including six degrees of possible freedom of movement of the physical movable platform surface in use.

Preferably the GUI and/or the VGR is arranged to allow a six degrees of freedom of movement of the VGR and/or physical movable platform surface in use.

Preferably the six degrees of freedom of movement include left/right movement (X axis movement), up/down movement (Y axis movement), forwards/backwards movement (Z axis movement), Yaw movement (rotation about the Y axis), Pitch movement (rotation about the X axis) and Roll movement (rotation about the Z axis).

Preferably micro-processing means are provided with or associated with the movement means or movement mechanism to allow control of movement of the same in use. For example, micro-processing means could be provided with or associated with each movable jack of movable platform in use.

Preferably the GUI allows control of the micro-processing means of the movement means or mechanism directly or indirectly.

According to a further aspect of the present invention there is provided a golf training system comprising: golf training apparatus including a physical movable platform, said physical movable platform including at least a physical movable platform surface, and a GUI for controlling movement of the at least physical movable surface.

In one embodiment the golf training system includes two or more golf training apparatus and the system is arranged to collect data from the two or more apparatuses to provide a combination of data. This data combination could be used to provide feedback to a user of the system, to provide pre-determined settings for selection on at least one GUI associated with the two or more golf training apparatuses and/or the like. For example, data could be collected from a number of different adaptive terrain platforms and used to create new practise regimes based on user behaviour.

Preferably the golf training apparatus can be used to track and/or sense one or more parameters associated with a user during an action epoch and communicate this sensed parameter data to the GUI. The GUI can display the parameter data on the VGR and/or GUI.

Preferably the GUI, the control unit and/or the physical movable platform can be updated remotely using appropriate hardware and/or software.

According to an aspect of the present invention there is provided a method of using a graphical user interface (GUI) suitable for use with golf training apparatus, said golf training apparatus comprising a physical movable platform including a physical movable platform surface, said method including the step of associating and/or communicatively coupling the GUI with the physical platform or physical movable platform surface, characterised in that the method further includes the step of the displaying, on the GUI, a virtual graphical representation (VGR) of the physical platform and/or physical movable platform surface with which the GUI is associated with and/or communicatively coupled with.

According to further independent aspects of the present invention there is provided a method of using a GUI; a method of using golf training apparatus and/or a method of using a golf training system.

The GUI of the present invention provides improved user visualisation of selected conditions of an associated adaptive terrain platform and allows rapid actuation and/or control of one or more control functions and/or parameters of the associated adaptive terrain platform in use. In addition, any or any combination of virtual data provided by the VGR and real world data provided by the associated adaptive terrain platform in use can be used to improve training and performance of the user.

The improved level of control provided by the GUI of the present invention results in a golf training system that is more representative of a real world golf environment. It allows the associated adaptive terrain platform to be moved in a more functional manner and allows user interaction with the platform in a more ecological manner. The GUI of the present invention allows a user to move away from a more traditional way of controlling an adaptive terrain platform by the selection of pre-determined non-visual settings (characterised as "explicit" notation) to a unique way of controlling an adaptive terrain platform by selection of pre-determined non-visual settings, user selectable arbitrary settings (characterised as "implicit" notation) which can be displayed, controlled and/or adjusted in both a visual and/or non-visual manner. This results in a GUI which allows greater interaction of the user to explore the actionable affordances and their environment, allows the user to create their own arbitrary selected environment conditions to provide enhanced skill acquisition. The resulting training tool engages the user to a greater extent and results in greater performance improvements.

Control of visual elements of the VGR provides a quick and efficient manner for a user to change the physical movable platform associated with the GUI and encourages the user to explore the golf training landscape, thereby allowing a guided discovery learning process.

The GUI therefore results in enhanced performance, rehabilitation, skill competence, allows ecological dynamic training, overcomes problems associated with effects of "performance anxiety" during learning and/or the like.

Embodiments of the present invention will now be described with reference to the following figures, wherein:

FIGS. 2a and 2b show screen shot examples of a graphical user interface (GUI) displaying a 2D and 3D virtual representation of associated adaptive terrain platform apparatus according to an embodiment of the present invention;

FIGS. 3a and 3b show screen shot examples of the GUI displaying a 2D and 3D virtual representation of associated adaptive terrain platform apparatus according to a further embodiment of the present invention;

FIG. 10 is a screen shot example of the GUI displaying a 3D virtual representation of associated adaptive terrain platform apparatus for displaying gravity lines in one embodiment.

Figure 1:
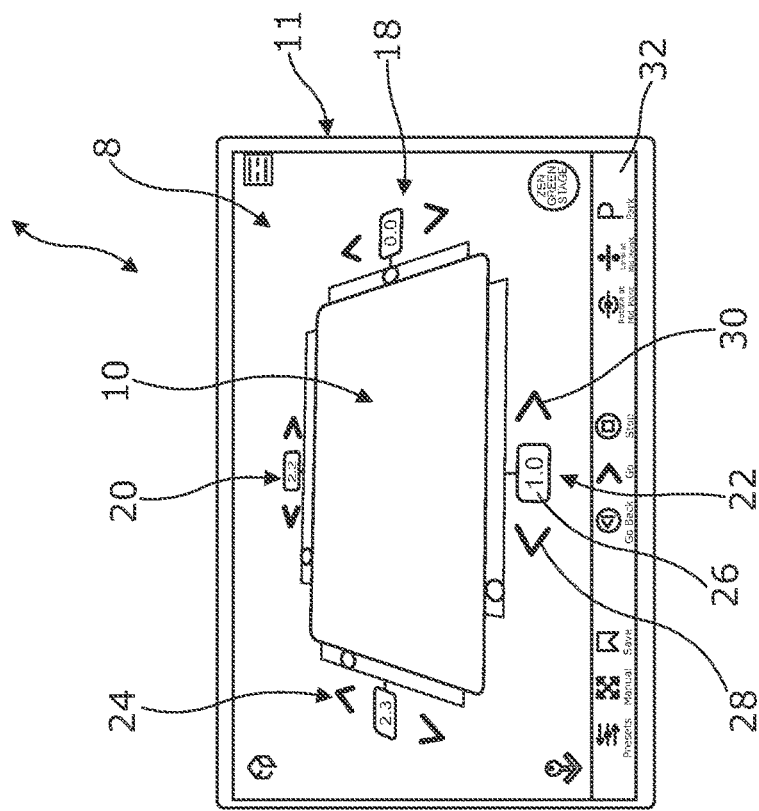
FIG. 1 is a schematic view of a golf training system according to an embodiment of the present invention.

Referring firstly to FIG. 1, there is illustrated a golf training system 2 according to an embodiment of the present invention including an adaptive terrain platform 4 of a type that can allow golf training to be undertaken in an indoor and/or outdoor setting. Examples of adaptive terrain platforms that could be used with the GUI are the Green Stage® Platform provided by Zen Green Stage Ltd, UK and the Swing Stage™ platform provided by Zen Green Stage Ltd, UK.

The Green Stage platform includes multiple motorised jacks that move the platform surface to different positions or cartesian positions in use. Each motorised jack can independently be moved between raised and lowered conditions, thereby changing the topography of the movable playing surface. The jacks can also be controlled to be raised and/or lowered collectively if required. Different combinations of actuation of the jacks allows different gradients/topographies to be provided on the physical platform playing surface 3. Optionally, at least one golf ball putting hole 5 can be located on the platform playing surface 3 to allow a user to putt a golf ball into the same when practising a golf swing or putt.

The system 2 further includes a control unit 6 that allows control of the adaptive terrain platform 4 and a graphical user interface (GUI) 8 for display on a touch screen display screen 11 of a hand held computer device, such as an iPad or tablet for example.

The GUI 8 is associated with the control unit 6 and platform 4 in such a manner that control of the associated platform 4 via the GUI 8 results in a comparable, corresponding equal or substantially equal control of the platform 4.

Two way communication can take place between the GUI 8 and the platform 4 directly (as shown by arrow 12), between the GUI 8 and the control unit 6 directly (as shown by arrow 14) and/or between the control unit 6 and the platform 4 directly (as shown by arrow 16). The GUI 8 and the platform 4 can communicate indirectly via the control unit 6. Other devices may communicate in a one way or two way manner with the GUI, such as for example, golf equipment, one or more sensing devices and/or the like.

In particular, each jack in the associated physical platform 4 is controlled by one of the control means on the GUI.

The GUI control means can control each jack to independently move up and/or down to provide six degrees of freedom of movement of the VGR and the physical playing surface 3 of the physical platform 4.

In accordance with the present invention, the GUI 8 is arranged to display a virtual graphical representation (VGR) 10 of the physical platform playing surface 3 of the associated physical platform 4, and control and/or a change in the VGR can result in a comparable or corresponding control and/or change in the physical platform 4 and/or the platform playing surface 3. This allows a user to easily visualise a past, present and/or future state of the physical platform playing surface on the VGR.

One or more visual control means provided on and/or associated with the VGR and/or GUI allows user selections of one or more pre-determined control functions, parameters and/or settings and/or allows user selected arbitrary selections to be made. This results in a system that allows greater user interaction with the same, improves engagement of the user with the system and results in improved skill acquisition by the user. One or more visually represented lines, images, icons and/or the like can be displayed on the VGR to represent certain environment conditions, topographies or gradients that are present and/or selectable by a user in use.

Referring to FIGS. 2a and 2b, it can be seen that the VGR 10, which represents the physical playing surface 3 of the associated physical platform 4 can be displayed in 2-dimensions (2D) or 3-dimensions (3D) respectively. A user can select which of the 2D or 3D display is shown on the GUI using control means in the form of a 3D view toggle button 7.

In one example, user selection of a visually represented control button or icon on the GUI results in a change in colour of the control button or icon so that a user can easily visualise the selection they have made.

Different colours, shades and/or tones can be used on the VGR to show a change in gradient, environmental conditions, topographies and/or the like of the VGR. Thus, the VGR utilises visual topography gradient colour indications in one example.

The colour of the VGR is such so as to contrast in appearance with the background 101 of the GUI.

There is typically two or more putting holes or cup locations 5 on the physical playing surface of the physical platform and the GUI 8 allows a user to select which putting hole or cup location 9 is to be shown on the VGR that corresponds with the physical playing surface putting hole/cup location 5 they are putting into.

Any or any combination of different user selectable control means for adjusting the gradient of the VGR can be provided. These control means are visually represented on the VGR and/or the GUI.

Control means in the form of a plurality of slider control means or bubbles 15, 17, 19, 21 are provided along the length of each side of the VGR. When each slider bubble 15, 17, 19, 21 is located centrally of a length or track 23 of the VGR, this corresponds to that side of the physical platform playing surface being level. When the slider bubble is moved off centre of the length or track 23 of the VGR, this corresponds to that side of the physical platform playing surface being at a gradient. A user is typically required to press and slide a bubble to move the same along the gradient slider or side of the VGR (i.e. a touch and slide function).

In one example, changing the gradient of the VGR using another visual control means provided on the GUI automatically moves the bubbles 15, 17, 19, 21 to correspond to the gradient of the VGR that has been selected using the other control means.

Further visual gradient control means 18, 20, 22, 24 are provided on each side of the VGR 10 to provide an alternative mechanism of movement of each side of the VGR.

Each gradient control means 18, 20, 22, 24 comprises a numeric display 26 showing the gradient of that side of the VGR and two opposing toggle arrows 28, 30 for increasing or decreasing the gradient number shown in the numeric display (i.e. for changing the gradient/slope of that side of the VGR and hence the corresponding side of the physical playing surface). In one example, each selection of a toggle arrow moves the gradient of that side of the VGR by 0.1%. Pressing and holding the toggle arrow icon using a user's finger can move the gradient continuously and rapidly if required until the user releases their selection on the toggle arrow.

Each slider control means 18, 20, 22, 24 allows independent and separate control of each jack of the associated platform 4 to provide the six degrees of freedom of movement of both the VGR and the physical movable playing surface of the physical platform.

The GUI 8 also displays a plurality of visual icons along a menu or action bar 32 to allow user selection of a number of possible user selectable options. For example, icon 34 is a preset button and allows a user to select one of a number of different pre-determined VGR and/or platform positions. Selection of the icon results in a drop down menu being displayed including a plurality of pre-determined platform, VGR and/or playing surface gradient positions. Selection of one of the pre-determined positions by a user using the GUI 8 results in the VGR showing the selected position and, if the user is happy with the selection, moving the associated physical platform to the selected position.

Icon 36 is a manual controller button and allows a user to input a manual selection and/or value for the physical associated playing surface 3 position.

Icon 38 is a save gradient button and allows a user to save a specific topography into the preset menu once they are happy with the same.

Icon 40 is a Go button which allows a user to select the currently selected or displayed VGR playing surface position to be actuated on the associated physical platform playing surface 3.

Icon 42 is a Go Back button and allows a user to select to go back to a previous physical platform setting, VGR setting and/or gradient.

Icon 44 is a Stop button and allows a user to select to stop movement of the associated physical platform 4, VGR and/or associated physical playing surface 3.

Icon 46 is a Rotate at midpoint button and allows a user to select for the physical associated playing surface 3 and/or the VGR 10 to be rotated about its midpoint.

Icon 48 is a Level at mid-point button and allows a user to select for the physical associated playing surface 3 and/or the VGR 10 to be levelled at its midpoint (i.e. to move to 0% gradient).

Icon 50 is a Park button and allows a user to select the VGR and/or the physical associated playing surface 3 to be moved and parked back to a 0% gradient position or level status.

Icon 51 allows a drop down menu to be displayed for selection of one or more operational functions of the GUI.

Icon 53 is a connection indicator which changes colour to show the GUI is connected to the physical platform 4.

Icon 104 is a visualisation function which allows a further visualisation icon menu to appear. The further visualisation icon menu allows different user selectable visual icons, lines, images and/or the like to be overlaid on the VGR to provide enhanced visual feedback to a user of the gradient, topography and/or environment of the VGR and/or physical movable platform.

Further control means in the form of a joystick control button 55 is provided to allow a user to adjust the gradient of the VGR 10, and thus the physical associated playing surface 3, via a joystick control. The joystick control typically allows a user to move the gradient of the VGR, and thereafter the associated physical playing surface 3, around a central pivot point.

Other optional visual icons and/or visualisation functions can be displayed on the GUI to show a ball tracking function; a ball trajectory function; topography contours; distance measurement means, such as concentric circles for example; a capture funnel function; gravity lines; mesh/topography lines; putting hole/cup selection; provide a write function; integration function; a ball location function; a putting hole/cup location function; a zero break line function; a twist button function and/or the like.

For example, selection of the ball tracking function activates a ball tracking system.

Selection of the ball trajectory function can activate a ball trajectory model that identifies and/or displays putt geometry possibilities to a user on the VGR.

Selection of the topography contours can display and/or superimpose a height contour map on the VGR.

Selection of the distance measurement concentric circles can display and/or superimpose distances from the putting hole 5 on the VGR. The distances measured could be adjusted by a user in a selection menu if required.

Selection of the capture funnel function can display can display fast and slow speeds at which a ball could be successfully put into the putting hole 5 using a zero break line as a reference.

Selection of the gravity lines function allows lines to be displayed and/or superimposed on the VGR 10 to show topography of the VGR. For example, a longer gravity line corresponds to a steeper slope.

Selection of the mesh/topography lines function allows a grid to be displayed and/or superimposed on the VGR to show topography in a different visual form to contour lines for example. For example, the closer the lines are together in the display, this corresponds to a steeper slope.

Selection of the putting hole/cup location function allows a user to select on the VGR 10 the number of holes/cups for trajectory and/or capture funnel actions.

Selection of the write function allows a user to use the GUI 8 to write, draw and/or add comments on. These can be saved if required.

Selection of the integration function allows a user to determine what integrations are active within the system at any point in time.

Selection of the zero break line function allows a user to display on the VGR where a straight line putt is to a user. This, in one example, can be defined by a gravity vector.

Selection of a twist button function allows selection of a double breaking putt, whereby ends of the VGR are moved to twist in opposite directions.

In one example, an E-Stop button is provided to provide an emergency stop to the physical associated platform if required.

Referring to FIGS. 3a and 3b, further examples of screenshots of the GUI are shown in which the joystick control icon 55 has been activated. The icon 55 changes colour from white to black to visually show to a user that they have successfully selected the joystick control mode.

A visual representation of the joystick control 57 is shown in the centre of the VGR 10. More particularly, the joystick control 57 includes four quadrants 52, 54, 56, 58 of a circle that are superimposed over the VGR with a joystick member 60. The cross hair created by the quadrants typically identifies the standard direction of play, which is important for users who have multiple putting hole/cup locations. The user presses and slides the joystick member into the different quadrants, thereby changing the gradient in each quadrant as required. Different colouration of the VGR can be used to correspond to different gradients to help the user to visualise the gradient of the VGR they have selected. If the user tries to move the joystick member 60 too fast, a warning message may appear to ask the user to slow down the joystick movement. A change in colour of the connection icon 53 shows visually to the user that the physical associated playing surface 3 is moving in a corresponding manner to the joystick movements.

Figure 4B:
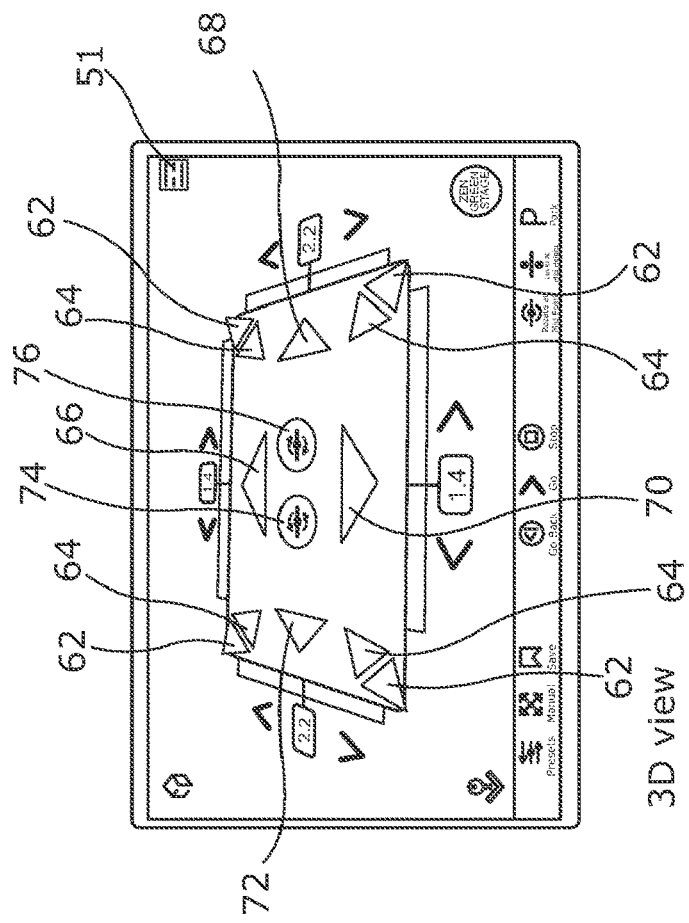
FIGS. 4a and 4b show screen shot examples of the GUI displaying a 2D and 3D virtual representation of associated adaptive terrain platform apparatus according to a yet further embodiment of the present invention.
Figure 4A:
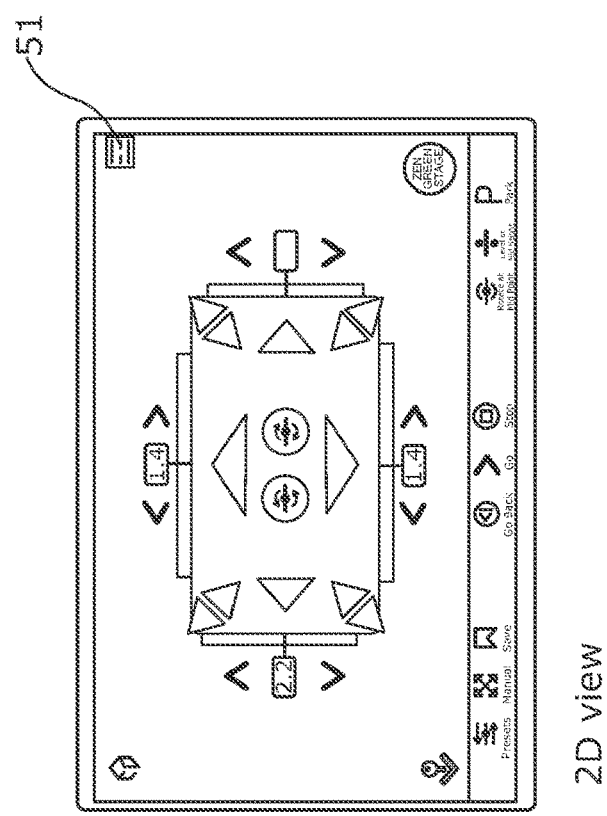

Referring to FIGS. 4a and 4b, further examples of screenshots of the GUI are shown in which manual control buttons can be displayed/superimposed on the VGR 10 following selection of the manual control icon 36 on the menu bar 32. In one example, the manual control icon 36 changes colour to visually show to the user the function has been successfully selected.

More particularly, a plurality of manual push button control means are displayed and include a plurality of arrow buttons 62, 64 located in each of the four corners of the VGR 10. A user presses and holds the buttons 62 or 64 to raise or lower each corner of the VGR to a user selected arbitrary position. Once the user is happy with the position, the user can select the go icon 40 to correspondingly move the associated physical playing surface 3 of the physical platform 4. The push button control means also include a plurality of arrow buttons 66, 68, 70, 72 for allowing each side of the VGR and hence the associated physical playing surface 3 of the physical platform 4 to be moved in a similar manner to that described above.

Push button 74 allows rotation of the VGR and thus the physical playing surface 3 of the associated physical platform 4 around the midpoint in an anti-clockwise direction. Push button 76 allows rotation of the VGR and thus the physical playing surface 3 of the associated physical platform 4 around the midpoint in a clockwise direction.

Figures 5A, 5B:
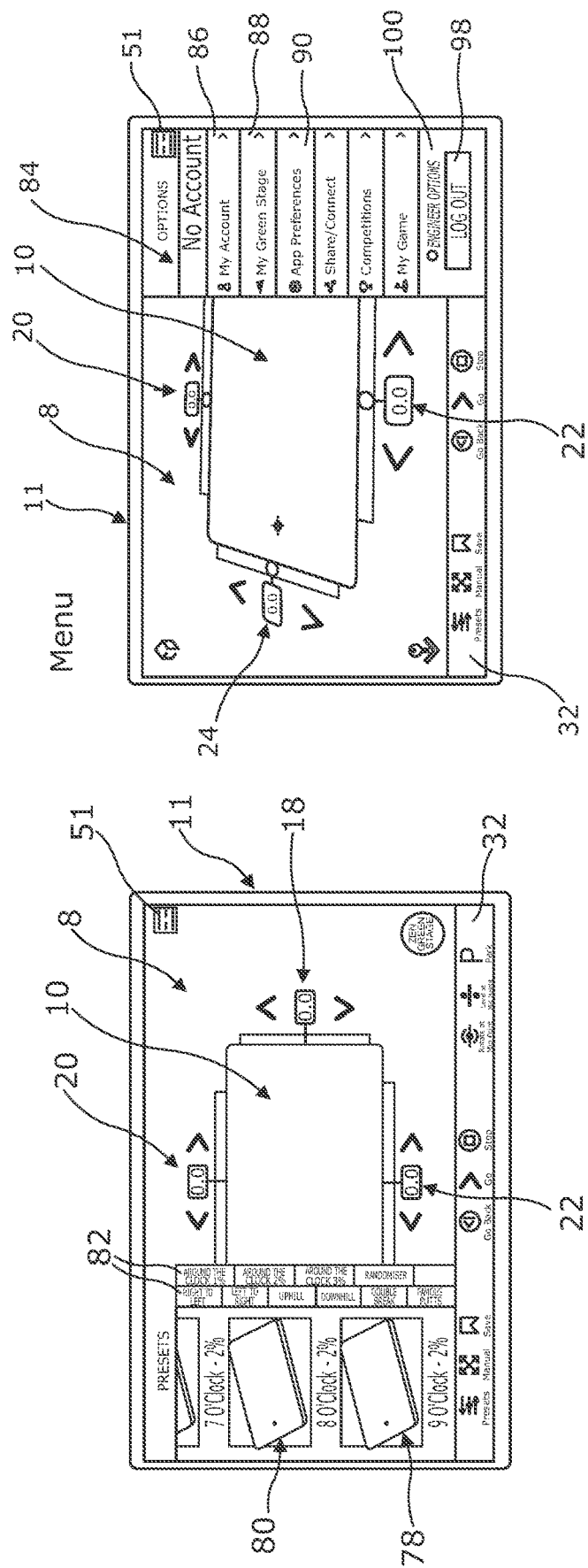
FIGS. 5a and 5b show screen shot examples of the GUI displaying a 2D and 3D virtual representation of associated adaptive terrain platform apparatus according to a yet further embodiment of the present invention.

Referring to FIG. 5a, an example of a screenshot of the GUI is shown for when the pre-set icon 34 is selected by a user, thereby resulting in a number of user selectable pre-determined VGR positions to be displayed to the user. In one example, the pre-set icon 34 changes colour to show to the user the function has been successfully selected. For example, the plurality of pre-determined VGR positions that could be shown may include: Numeral 78 represents the VGR with the putting hole located at 9 o'clock and the platform having a 2% gradient. Numeral 80 represents the VGR with the putting hole located at 8 o'clock and the platform having a 2% gradient. A plurality of pre-determined tabs 82 can be displayed via the icon 34 for selection by the user. Once a user is happy with the selection they have made, they can press the go icon 40 to cause the physical playing surface 3 of the associated physical platform 4 to be moved to the selected gradient and putting hole position.

Referring to FIG. 5b, an example of a screenshot of the GUI is shown for when the menu icon 51 has been selected. The drop down menu 84 allows a user to select sub-options in the form of: their account details 86 (allows a user to input and/or change their account settings), the associated platform settings 88 (allows a user to select the set up options for their physical associated platform 4, such as for example platform size, putting hole/cup location and/or the like), App preferences 90 (allows a user to customise certain user preferences, such as for example the sensitivity of the control buttons or joystick, invert the control means and/or the like), share/connect option 92, competition option 94, "my game" option 96, and a logout option 98. An engineering option 100 can also be provided. This allows the code commands that are being sent to the associated physical movable platform to be changed and/or allows commands to be sent to an engineers terminal.

In one detailed example of using the golf training system of the present invention, a user uses the GUI to select a golf ball position on the VGR that they intend to start their golf ball training shot. The user then selects one of a number of possible golf ball holes they intend to aim the golf ball to on the VGR. The user selects a golf ball trajectory from the golf ball starting position to the hole. The user controls the gradient of the VGR to correspond to a golf landscape they wish to train over. Once the user is happy with their selections, they accept these selections and signal for the associated physical movable platform surface to move to the selected gradient and to monitor the golfers real world position, golf ball position, golf ball hole and golf ball trajectory.

A user stands on the physical movable platform surface and tried to make the shot they have planned on the VGR on the GUI.

Once the actual real world shot has been completed by the user, the user can then return to the GUI and, using data measured by sensing means provided on or associated with the physical movable platform, the GUI shows how the real world shot diverged from the virtual shot pre-programmed on the VGR.

Figure 6:
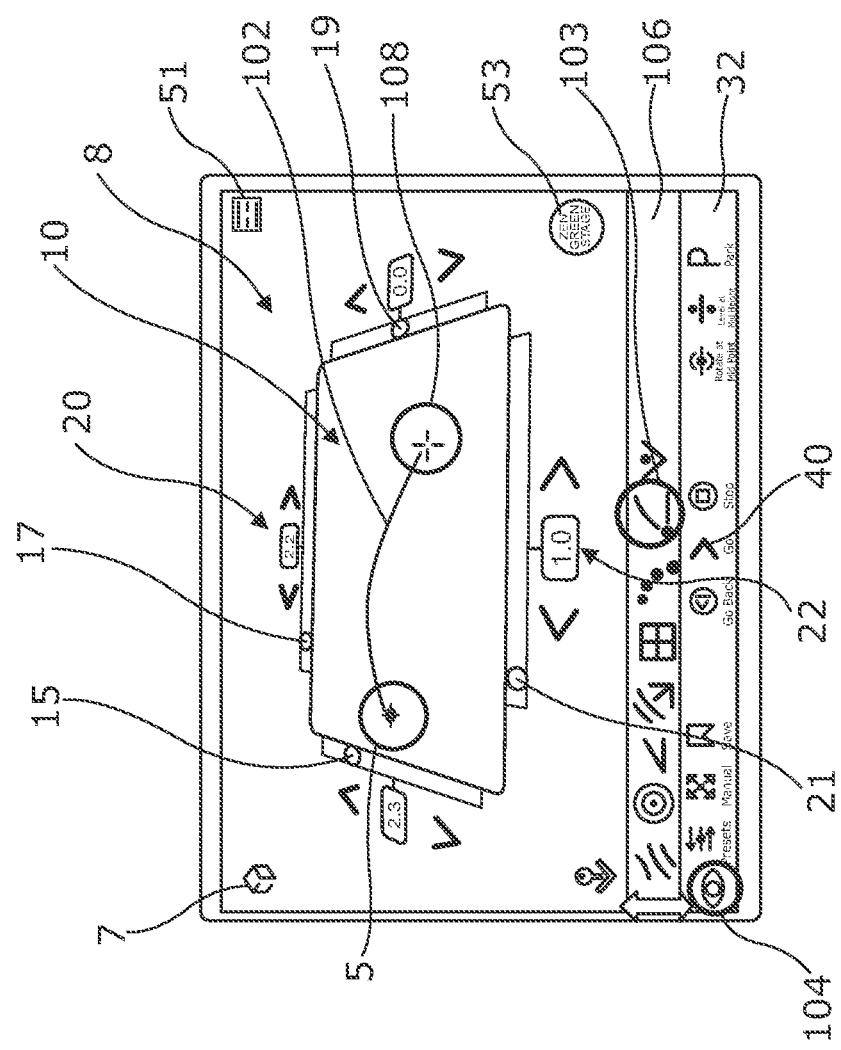
FIG. 6 is a screen shot example of the GUI displaying a 3D virtual representation of associated adaptive terrain platform apparatus for displaying a golf ball trajectory in one embodiment.

FIG. 6 is a further screen shot example of the GUI 8 displaying a 3D VGR 10 of the physical playing surface 3 for viewing a golf ball trajectory 102. The mode is selected by a user selecting a visualisation option 104 on the action bar 32. This displays a further menu bar 106, which shows a plurality of possible visualisation modes or icons, on which is a golf ball trajectory mode 103, which the user can select.

In the illustrated example, the ball trajectory 102 has a golf ball trajectory starting point 108 and a trajectory end point, which in this example is the hole/cup location 5. The user is able to select and drag either the trajectory starting point or the trajectory end point to allow adjustment of the trajectory 102 to a user selected position to represent a golf putt trajectory. The user is also able to select and drag the trajectory line like a node on a Bezier curve to allow a user to manipulate the constraints of the ball trajectory to result in a corresponding shaping of the topography of the physical playing surface 3. Movement of the trajectory line 102 by the user also results in a corresponding movement of the slider bubbles 15, 17, 19, 21 of the VGR to reflect the change in gradient/topography of the VGR 10. Once a user is happy with the trajectory selection they have made, they can select the Go icon 40 to move the physical playing surface 3 to the corresponding topography and then try and reproduce the golf ball trajectory in reality on the physical playing surface 3.

Figure 7:
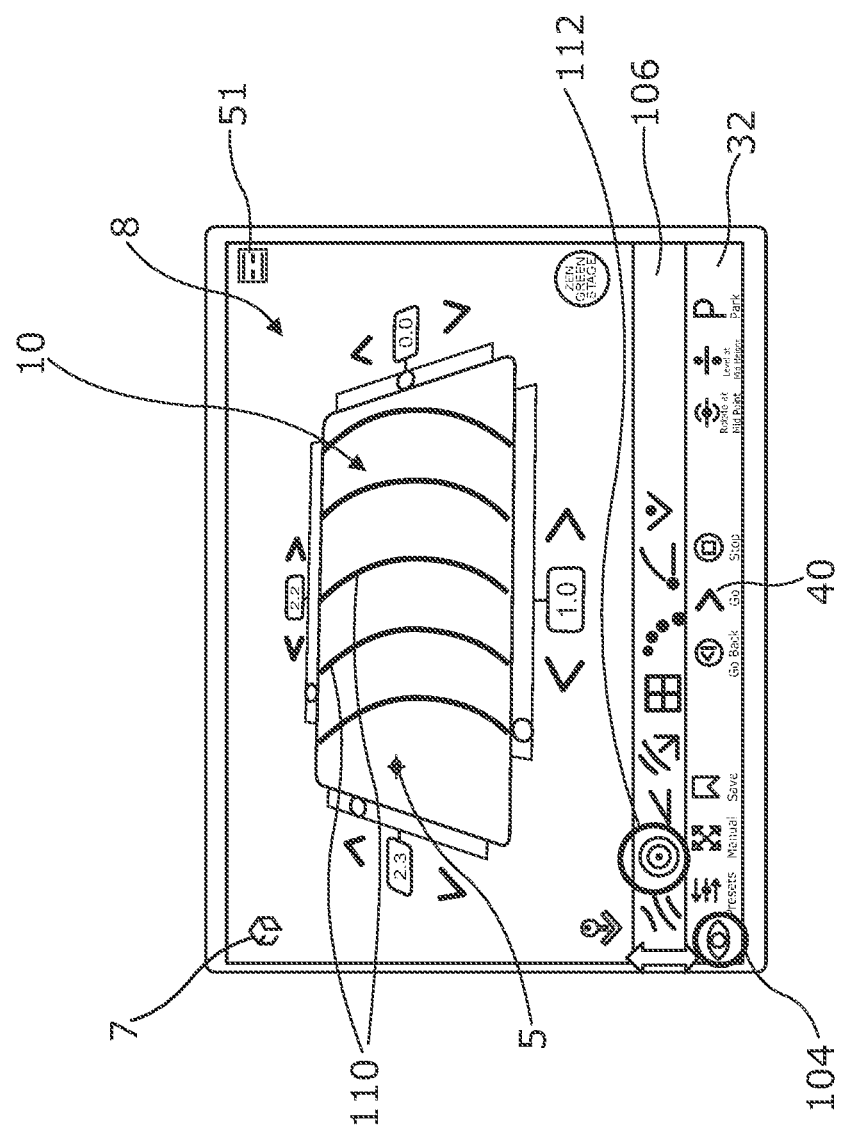
FIG. 7 is a screen shot example of the GUI displaying a 3D virtual representation of associated adaptive terrain platform apparatus for displaying distance lines in one embodiment.

FIG. 7 is a screen shot example of the GUI 8 displaying a 3D VGR 10 of the physical playing surface 3 for displaying distance lines 110 in one embodiment. The mode is selected by a user using the visualisation option 104 as previously described and then selecting a distance circle line mode 112. Partial distance circle lines 110 appear on the VGR 10 that are spaced apart by 1 ft intervals from the hole/cup location 5. A user can customise the distance line intervals to any suitable distance required.

Figure 8:
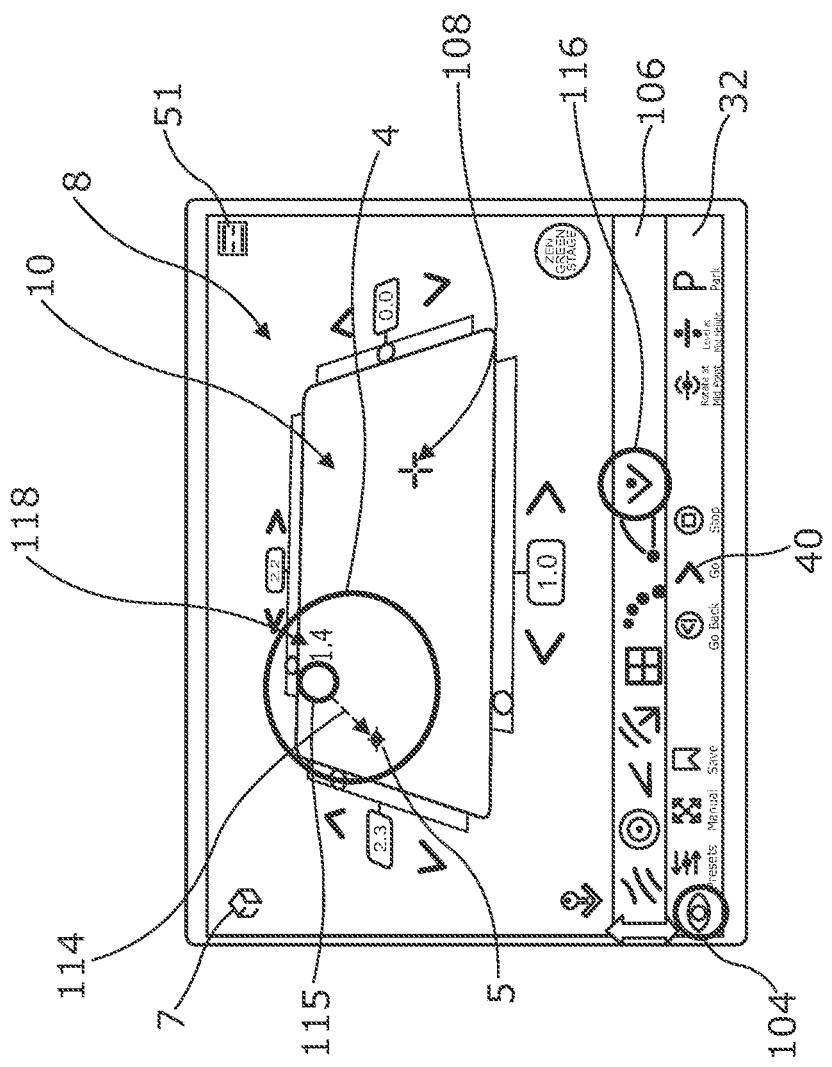
FIG. 8 is a screen shot example of the GUI displaying a 3D virtual representation of associated adaptive terrain platform apparatus for displaying a zero break line in one embodiment.

FIG. 8 is a screen shot example of the GUI 8 displaying a 3D VGR 10 of the physical playing surface 3 for displaying a zero break line 114 in one embodiment. The mode is selected by a user using the visualisation option 104 as previously described and then selecting the zero break line mode 116. The zero break line 114 is displayed on the VGR 10 and illustrates a straight putt line from the high side of the hole/cup location 5 showing the putt line from a ball position 115 to the hole/cup location 5. The length of this line 114 depicts the severity of the slope (gravitational pull) and a numerical display 118 also shows the % gradient. If the user presses and holds the ball position and/or the numerical display, they can move the start position of the zero break line and/or change the gradient as required. Movement of the break line 114 by the user also results in a corresponding movement of the slider bubbles 15, 17, 19, 21 of the VGR 10 to reflect the change in gradient/topography of the VGR 10. Once a user is happy with the break line 114 selection they have made, they can select the Go icon 40 to move the physical playing surface 3 to the corresponding topography and then try and reproduce the break line putt in reality on the physical playing surface 3.

In one embodiment, a user could select both the ball trajectory mode 103 and the zero break line mode 116 at the same time. In this arrangement, a ball trajectory line 102 is shown with three zero break lines 114 on the VGR 10. The user can press and hold any of the lines 102, 114 to move the same and/or change the gradient of the same. For example, the three zero break lines can be provided at the trajectory start point, at the trajectory end point or cup location 5 and at a point intermediate the start and end points.

Figure 9:
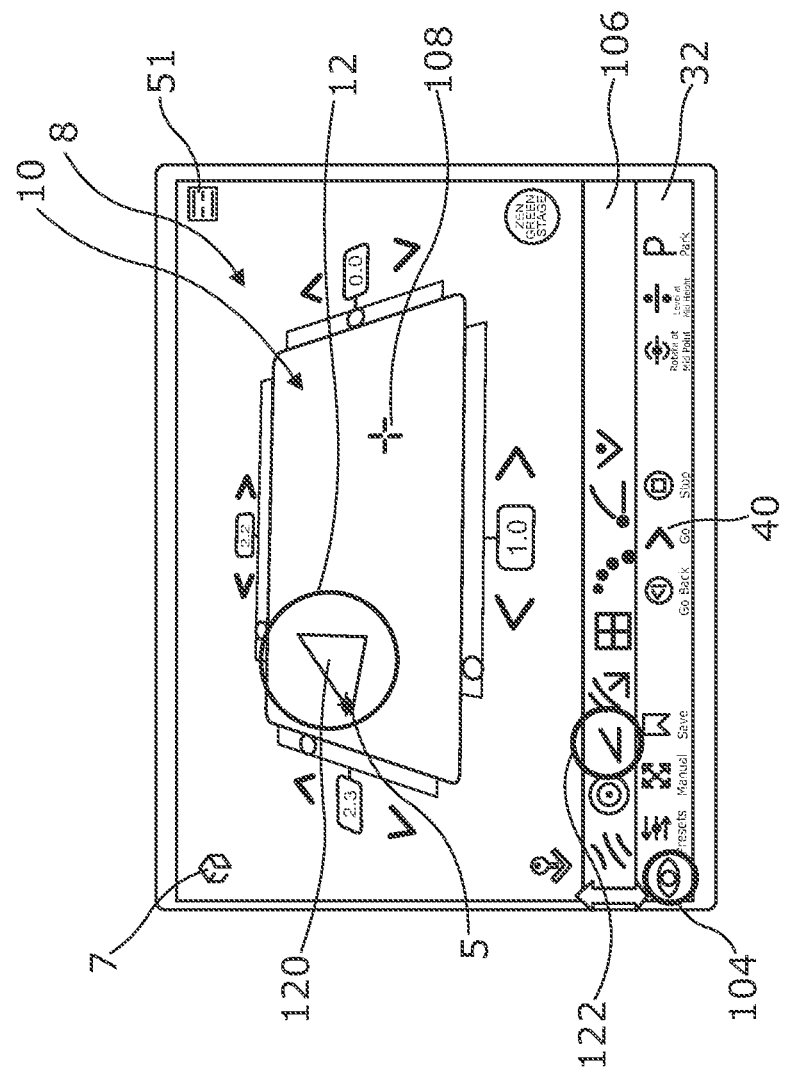
FIG. 9 is a screen shot example of the GUI displaying a 3D virtual representation of associated adaptive terrain platform apparatus for displaying a capture funnel image in one embodiment.

FIG. 9 is a screen shot example of the GUI 8 displaying a 3D VGR 10 of the physical playing surface 3 for displaying a capture funnel 120 image in one embodiment. The mode is selected by a user using the visualisation option 104 as previously described and then selecting the capture funnel mode 122. The capture funnel 120 is based on the ball position, the cup location 5 and the topography of the playing surface of the VGR 10. This is determined from the slowest speed the ball can roll in (zero break line) and the fastest speed, such that the funnel calculation is based around speed determining the cup's capture diameter. Colour shading on the funnel image 120 can be used to show the speed at which the ball can be captured in the cup location 5 (i.e. a lighter shade shows a slower ball speed and a darker shade shows a faster ball speed). The gradient differences to reflect the slower and faster ball speed areas are shown on the VGR. This helps the user to identify the perceptual cues (high vs low side topography) and what type of behaviour/putt speed is needed. The user is able to select the capture funnel 120 by pressing and moving the same across the screen to a user selected arbitrary position. This allows the associated topography of the VGR to be changed. Once a user is happy with the capture funnel image selection 120 they have made, they can select the Go icon 40 to move the physical playing surface 3 to the corresponding topography and then try and reproduce the putt in reality on the physical playing surface 3.

FIG. 10 is a screen shot example of the GUI 8 displaying a 3D VGR 10 of the physical playing surface 3 for displaying gravity lines 124 in one embodiment. The mode is selected by a user using the visualisation option 104 as previously described and then selecting the gravity line mode 126. The gravity lines 124 show the severity of the gradient of the VGR 10 at that point. If a user selects one of the gravity lines 124, a numerical gradient value can be shown. A user can select any of the gravity lines and move the same to alter the gradient as required. Once a user is happy with the gradient line 124 selection they have made, they can select the Go icon 40 to move the physical playing surface 3 to the corresponding topography.

Figure 11:
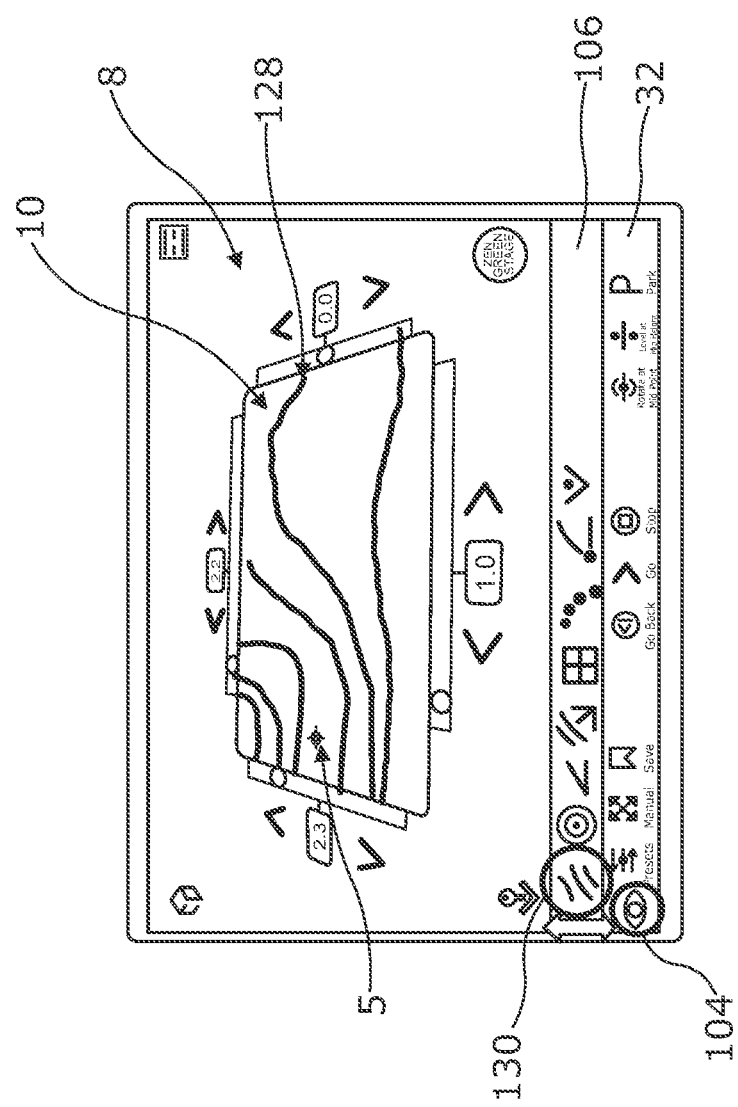
FIG. 11 is a screen shot example of the GUI displaying a 3D virtual representation of associated adaptive terrain platform apparatus for displaying a contour map in one embodiment.

FIG. 11 is a screen shot example of the GUI 8 displaying a 3D VGR 10 of the physical playing surface 3 for displaying a contour map 128 in one embodiment. The mode is selected by a user using the visualisation option 104 as previously described and then selecting the contour map mode 130. The contour map 128 is based on topography depicting the height and gradient of any slope on the VGR 10. The closer the lines are together, the steeper the gradient that is being depicted. A user can select any of the contour lines of the map 128 and move the same to change the gradient on the VGR. Movement of the lines of the contour map 128 by the user also results in a corresponding movement of the slider bubbles 15, 17, 19, 21 of the VGR 10 to reflect the change in gradient/topography of the VGR 10. Once a user is happy with the contour map 128 selection they have made, they can select the Go icon 40 to move the physical playing surface 3 to the corresponding topography.

A terrain mesh can be provided in a similar manner to the contour map if required.

The selections of lines and/or icons can be made by finger selection, such as a drag and drop function. This can be done using a user's single digit or multiple user's digits.

Although the illustrated examples show GUIS with certain functionality, it will be appreciated that any or any combination of the abovementioned features could be provided in the GUI, golf training apparatus and/or system as required and still fall within the scope of the present invention.

The invention claimed is:

1. A graphical user interface (GUI) for use with golf training apparatus, said golf training apparatus, comprising: a physical movable platform including a physical movable platform surface, said GUI arranged so that it can be associated with and/or communicatively coupled with the physical platform or physical movable platform surface in use, characterised in that the GUI includes or is arranged to display in use a virtual graphical representation (VGR) of the physical platform and/or physical movable platform surface with which it is associated with and/or communicatively coupled with, wherein the GUI and/or VGR includes control means, visual control means and/or one or more visual icons for allowing a user to select and/or control the VGR, one or more control functions and/or one or more parameters of the VGR, of the physical platform and/or physical movable platform surface in use.

2. The GUI according to claim 1, wherein the VGR is arranged to display data relating to a golfing environment, wherein one or more user selections that could be made or have been made to the VGR, the physical platform or the physical movable platform surface; and/or a past, current or future status, situation and/or setting of the physical platform, the physical movable platform surface, a further physical platform, a further physical movable platform surface, a golf player, an item of golf equipment and/or a golf player using the physical platform, physical movable platform surface, further physical platform or further physical movable platform surface in use.

3. The GUI according to claim 1, wherein one or more dimensions, shape, design, position, topography, gradient and/or orientation of the VGR displayed via the GUI is arranged to corresponding wholly or substantially wholly to one or more dimensions, shape, design, position, topography, gradient and/or orientation of the physical platform and/or physical movable platform surface in use; or wherein one or more dimensions, shape, design, position, topography, gradient and/or orientation of the VGR displayed via the GUI is arranged to be a scaled or scaled down version or representation of the physical platform and/or physical movable platform surface in use.

4. The GUI according to claim 1, wherein the GUI is arranged so that a visual appearance, view type, size, position, one or more colours and/or orientation of the VGR that is displayed on the GUI is selectable and/or adjustable by a user in use.

5. The GUI according to claim 1, wherein user selection of one or more control functions of the GUI and/or VGR results in or is arranged to result in a comparable, corresponding, scaled, equal or substantially equal control of the physical platform and/or physical movable platform surface of the physical platform.

6. The GUI according to claim 1, wherein the control means, visual control means and/or one or more visual icons includes any or any combination of one or more sliders or slidable members; one or more toggles or toggle members; voice activation means; one or more dials or dial members; one or more rotatable, slidable and/or pivotable members; one or more joysticks or joystick members; one or more push or touch screen buttons; one or more drag and drop means, one or more spirit bubble level means or members, haptic means, vision tracking devices, voice activated means, brain computer interface, anatomical gesture recognition device, one or more transducers, neuromuscular stimulation means, visual display means, augmented reality means, or virtual reality means.

7. The GUI according to claim 1, wherein selection or actuation of the control means, visual control means and/or one or more visual icons on the GUI or VGR is arranged to result in a change of appearance of the control means, visual control means, one or more visual icons, and/or issuance of a visual, audio and/or kinaesthetic signal to inform a user that a selection or actuation has taken place.

8. The GUI according to claim 1, wherein the one or more control functions or one or more parameters controlled by the control means, visual control means and/or visual icons include any or any combination of one or more pre-determined controlled settings, one or more user-selectable arbitrary settings, a gradient, terrain, one or more environmental conditions or constraints, topography, one or more manual selections, one or more pre-determined selections, any or any combination of movement up to and including six degrees of freedom of movement, actuation of a control operation, stopping of a control operation, reverting back to a previous control operation, saving a control operation, levelling the gradient of the platform surface, actuating a ball tracking function, actuating a ball trajectory function; displaying a contour map and/or one or more contour lines; displaying a ball trajectory line; displaying a zero break line; displaying a capture funnel; displaying distance measuring means; displaying gravity lines; displaying optimal ball trajectory data; collision geometry; hole/target geometry; hole/target capture funnel geometry; changing coordinate gradients of the movable platform surface; stop and/or starting the electrical power to the GUI, control unit and/or the platform; or inputting user data.

9. The GUI according to claim 1, wherein the GUI is arranged to receive data from the physical platform, the physical movable platform surface, a player of the physical platform or physical movable platform surface, sensing means associated with the player, equipment and/or physical platform or physical movable platform surface, real world feedback data, image data, audio data, broadcast image data and/or broadcast audio data, and for the data to be displayed or converted for display on the VGR and/or GUI in use.

10. The GUI according to claim 1, wherein different coloured lines, shapes, images, icons and/or colour tones are used on the GUI to show a difference in gradient, height, terrain and/or topography of the VGR in use.

11. The GUI according to claim 1, wherein the GUI is arranged to display and/or control on the VGR at least one virtual trajectory of a golf ball and/or a golf putting hole.

12. The GUI according to claim 1, wherein the GUI and/or VGR are arranged to allow up to six possible degrees of freedom of movement of the VGR and/or physical movable platform or physical movable platform surface in use.

13. Golf training apparatus, said golf training apparatus including:
a physical movable platform including a physical movable platform surface;
an electronic device including micro-processing means;
display means provided on, associated with or connectable to the electronic device;
a graphical user interface (GUI) for display on the display means and arranged so that it is associated with and/or communicatively coupled with the physical movable platform or physical movable platform surface in use; characterised in that the GUI includes or is arranged to display in use a virtual graphical representation (VGR) of the physical platform and/or physical movable platform surface with which it is associated with and/or communicatively coupled with, wherein the GUI and/or VGR includes control means, visual control means and/or one or more visual icons for allowing a user to select and/or control the VGR, one or more control functions and/or one or more parameters of the VGR, of the physical platform and/or physical movable platform surface in use.

14. A method of using a graphical user interface (GUI) suitable for use with golf training apparatus, said golf training apparatus, comprising: a physical movable platform including a physical movable platform surface, said method including the step of associating and/or communicatively coupling the GUI with the physical platform or physical movable platform surface, characterised in that the method further includes the step of the displaying, on the GUI virtual graphical representation (VGR) of the physical platform and/or physical movable platform surface with which the GUI is associated with and/or communicatively coupled with, wherein the GUI and/or VGR includes control means, visual control means and/or one or more visual icons for allowing a user to select and/or control the VGR, one or more control functions and/or one or more parameters of the VGR, of the physical platform and/or physical movable platform surface in use.

* * * * *